Nov. 11, 1941. F. J. SHOOK 2,262,259
TREAD STITCHING APPARATUS
Filed Aug. 8, 1939 5 Sheets-Sheet 2
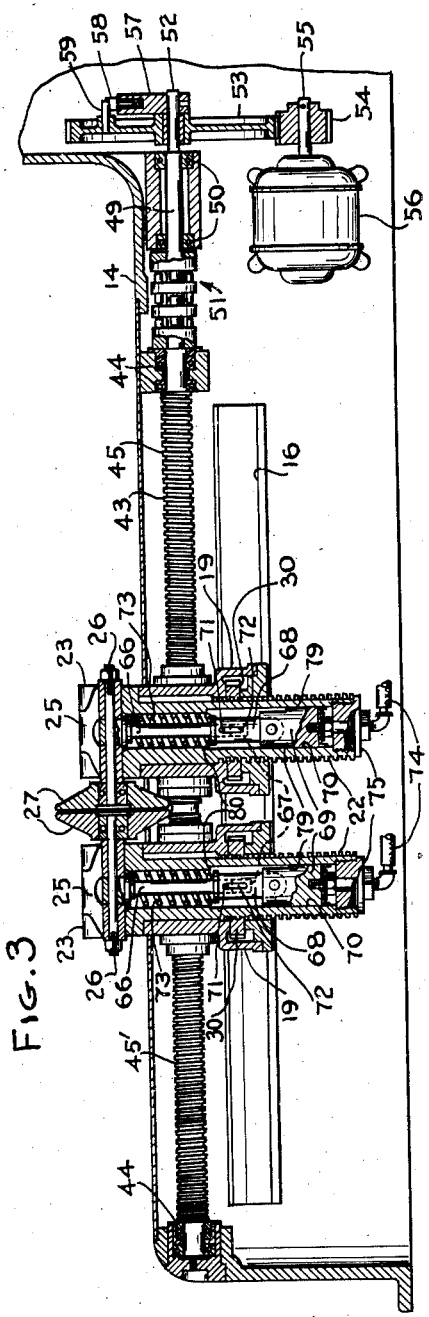
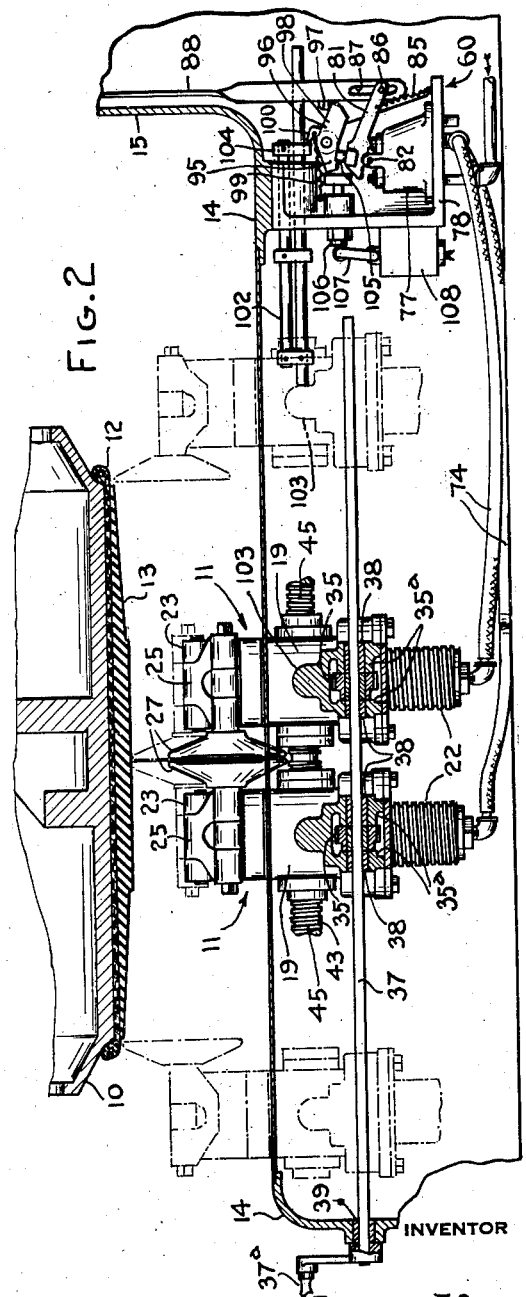
INVENTOR
FLORAIN J. SHOOK
BY
J. Ralph Barrow
ATTORNEY Nov. 11, 1941.　　　　F. J. SHOOK　　　　2,262,259
TREAD STITCHING APPARATUS
Filed Aug. 8, 1939　　　　5 Sheets-Sheet 3

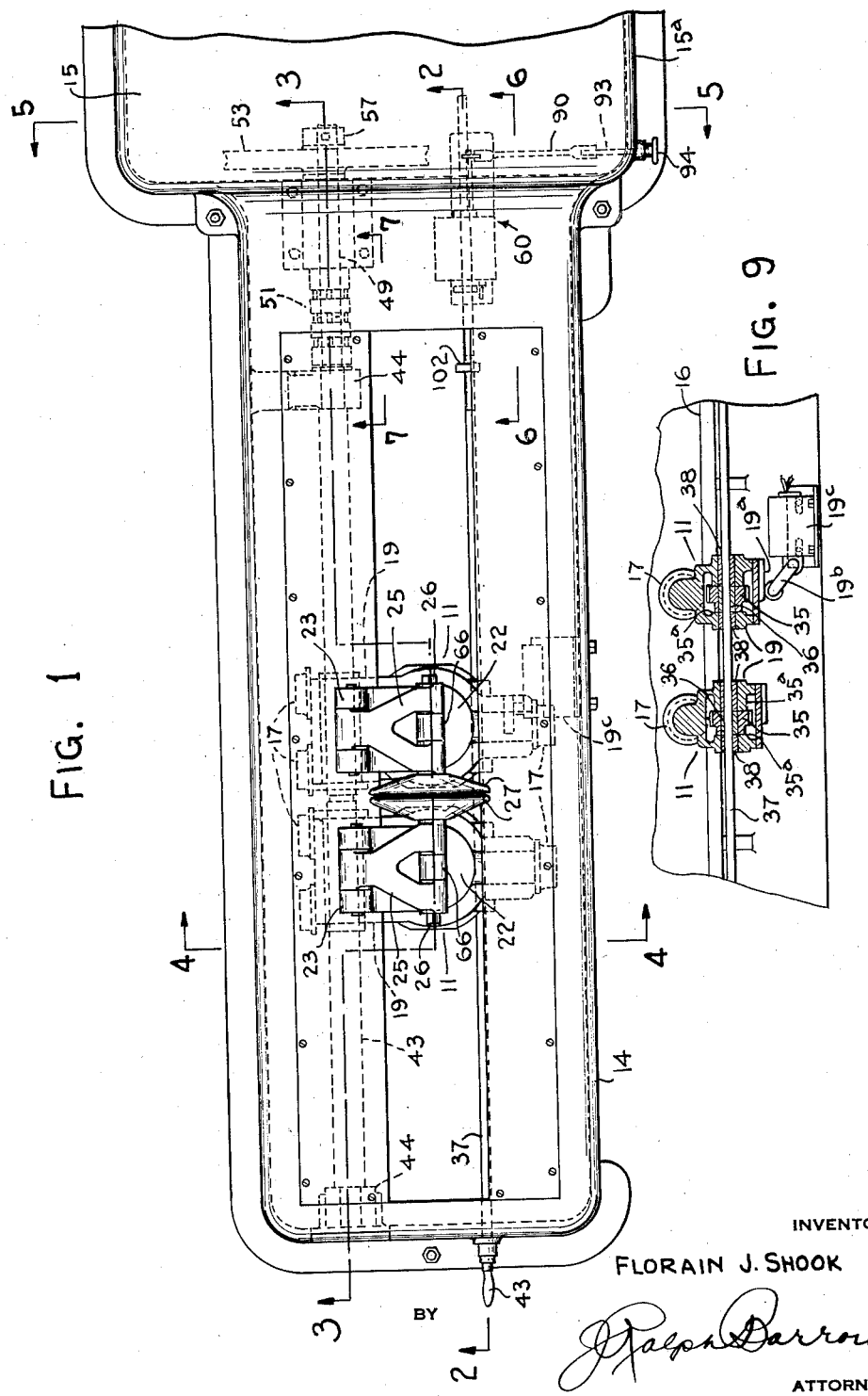

INVENTOR
FLORAIN J. SHOOK
BY
ATTORNEY

Nov. 11, 1941.   F. J. SHOOK   2,262,259
TREAD STITCHING APPARATUS
Filed Aug. 8, 1939   5 Sheets-Sheet 5
FIG. 6
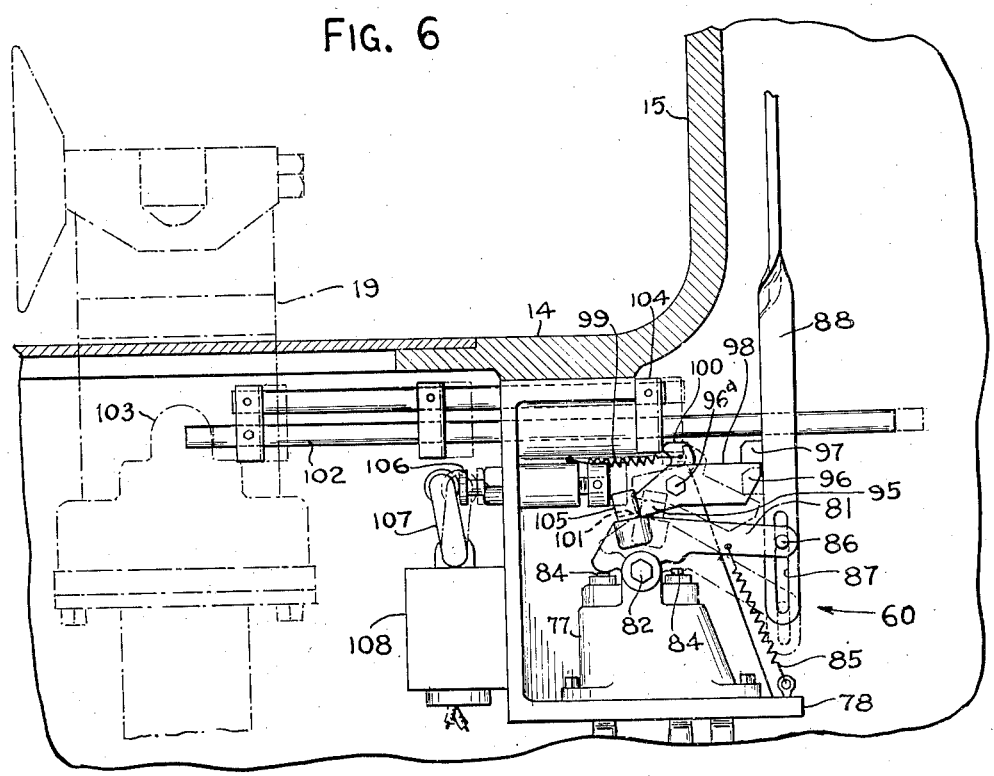
FIG. 7
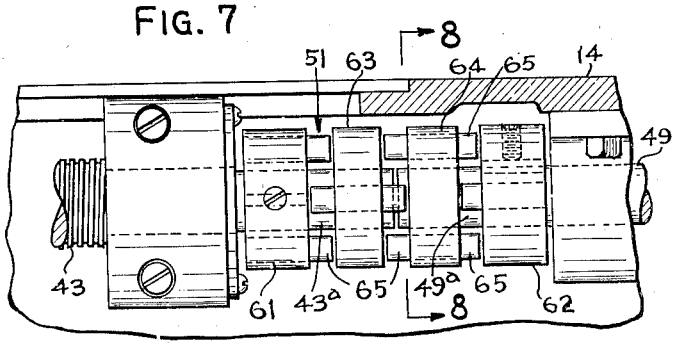
FIG. 8
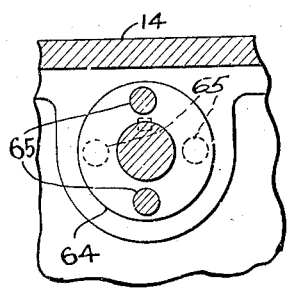
FIG. 10
INVENTOR
FLORAIN J. SHOOK
ATTORNEY Patented Nov. 11, 1941

2,262,259

UNITED STATES PATENT OFFICE 2,262,259

TREAD STITCHING APPARATUS

Florain J. Shook, Akron, Ohio, assignor to National Rubber Machinery Company, Akron, Ohio, a corporation of Ohio Application August 8, 1939, Serial No. 288,983

2 Claims. (Cl. 154—10)

This invention relates to tire building machines, and in particular, relates to apparatus for stitching or pressing the tread layers onto pneumatic tire casings.

A general object of the invention is to provide, in a tire building machine, improved means for automatically stitching the tread layer onto pneumatic tire casings built by the flat-band method which will be simple and economical to construct and which will require less adjustment and maintenance in use.

A particular object of the invention is to provide simple, direct-acting, easily-adjustable apparatus of the character described in which the stitching pressure of the stitcher tools or discs will be uniformly applied and proportionately decreased at the thinner edge portions of the tread layer of the tire than at the relatively thick central portions, thereby obviating stretching, distorting, or disrupting said edge portions.

Other objects will be manifest from the following brief description and the accompanying drawings.

Of the accompanying drawings:

Figure 1 is a plan view of the apparatus embodying the invention.

Figure 2 is a cross-section taken substantially on line 2—2 of Figure 1, illustrating the same in association with a tire-building drum.

Figure 3 is a cross-section taken substantially on line 3—3 of Figure 1.

Figure 6 is an enlarged cross-section, taken substantially on line 6—6 of Figure 1, illustrating the control mechanism in detail.

Figure 7 is an enlarged cross-section, taken substantially on line 7—7 of Figure 1, illustrating the delayed action clutch in detail.

Figure 8 is a cross-section taken on line 8—8 of Figure 7.

Figure 9 is a cross-section taken substantially on line 9—9 of Figure 4, showing the reversing limit switch.

Figure 10 is a schematic wiring diagram of the electrical connections for the apparatus.

Figure 4:
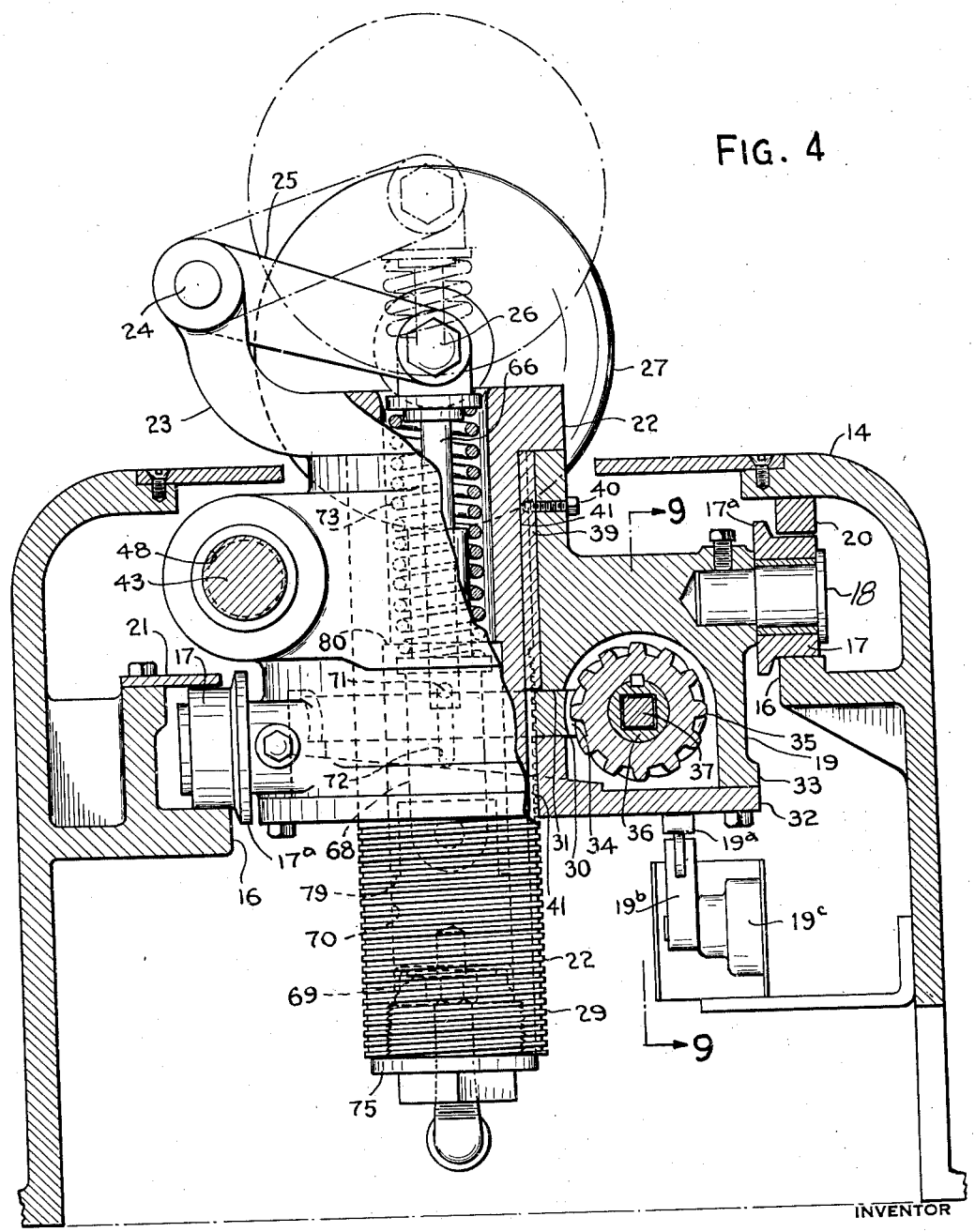
Figure 4 is an enlarged cross-section, partly broken away and in section, taken on line 4—4 of Figure 1.

Referring to the drawings, 10 is an annular collapsible drum, of the type used for building pneumatic tires by the flat-band method, the same being suitably supported to be in association with a pair of laterally shiftable tread-stitching devices, indicated generally at 11, 11, as shown in Figure 2. Drum 10 may be rotated in either direction in a known manner by suitable mechanism (not shown). It will be understood that the usual fabric tire casing 12 is first built on drum 10, after which an annular tread layer 13 comprising a slab of pre-shaped rubber is applied about the periphery of the casing, to be stitched thereto by means of the stitching devices 11, as will be described.

Mounted on the floor beneath the drum 10 is a hollow base member 14, which preferably is integral with the base 15 which supports the drum and drum-operating mechanism (not shown). Interiorly of base 14, on opposite walls thereof, may be longitudinally extending guides or tracks 16, 16 for flanged rollers 17, 17, journalled on pins 18 fixed in stitcher carriages 19, 19, shiftably to support the latter. Each carriage 19 preferably has two rollers at the rear side and one at the front side thereof, whereby the flanges 17a on the rollers will effectively guide the carriages along tracks 17. Longitudinally extending bars 20, 21, suitably fixed on base 14 in spaced relation above tracks 16, prevent substantial vertical movement of the carriages.

Supported for vertical adjustment in each carriage 19 is an air cylinder 22, at the upper end of which is a bifurcated arm 23 having a lever 25 pivoted thereto at 24. A pin 26 extended through the bifurcated free end of lever 25 may support a rotatable stitching disc 27, levers 25 on both carriages 19 being shiftable on pivots 24 to move the stitching-discs toward and from engagement with the tire being built on drum 10, as will subsequently be described. The discs carried by the respective carriages 19, 19 are arranged in oppositely disposed relation on the inner ends of pins 26, so that the flat inner faces of the discs will substantially be in abutment when the same are in position centrally of the drum for the start of a stitching operation, as shown in Figures 1, 2 and 3.

For vertically adjusting cylinders 22 in carriages 19 the cylinders are exteriorly threaded at 29 to receive an interiorly threaded nut or ring 30, which is loosely but snugly retained in abutment with a central boss 31 in the carriage by a cap 32 secured to downwardly extending portions 33 in the carriage. The nuts 30 of the respective stitching devices 11, 11 may be provided with teeth 34 for meshing with gears 35 retained between spaced bosses 35a, 35a in carriage 19 and keyed on bushings 36 relatively slidable with the carriage on a square shaft 37, the latter being slidably received through square openings in sleeves 38, 38 rotatable in the bosses 35ª. Cylinder 22 is retained against rotational movement in carriage 19 by means of a key 39 secured in the carriage by a screw 40, this key being vertically slidably received in a keyway 41 in the cylinder 22. One end of shaft 37 may extend through a square opening in a sleeve 42 rotatably received through a wall of base 14. The outwardly extending end of shaft 37 has a crank handle 37ª thereon for turning the shaft at will, the arrangement being such that turning shaft 37 in the proper direction turns the nuts 30, causing vertical movement of the cylinder 22 to adjust the positions of stitcher discs 27 relative to drum 10 for different sizes of drums or tires. The adjustment may be made while the stitcher mechanism is either stationary or in operation.

For longitudinally moving the stitcher mechanisms 11, 11 in opposite directions a driven shaft 43, journalled at opposite ends in suitable bearings 44, 44 mounted in the base 14, may be provided with opposite-hand threaded portions 45, 45' extending from the central portion of the shaft, each threaded portion being engageable through interiorly threaded openings 48 in one of the carriages 19. Rotation of shaft 43 in opposite directions causes movement of the carriages 19, 19 to and from each other.

A stub shaft 49, suitably journalled in bearings 50, 50 mounted in base 14, may be connected to one end of screw-shaft 43 through a lost motion clutch mechanism, indicated generally at 51 and subsequently to be described. An extension 52 from stub shaft 49 may have journalled thereon a gear 53 which meshes with a gear 54 fixed on a shaft 55 of a suitable electric motor 56. Fixed on the end of extension 52 may be a radially extending arm 57, from the end of which projects a spring-pressed latch device 58 engageable by a pin 59 projecting from the side of gear 53. The arrangement is such that when gear 53 is rotated in either direction, by operation of motor 56, latch 58 must be engaged by pin 59 to cause rotation of stub-shaft 49 which, through clutch mechanism 51, rotates screw shaft 43 for laterally shifting stitcher devices 11, 11. It is readily seen that each time the motor 56 is reversed in operation gear 53 will make a full revolution before pin 59 engages latch 58 to drive the stub-shaft 49, thereby providing lost motion in addition to that obtained through clutch mechanism 51. The operation of motor 56, which preferably is of the reversing type, may be automatically controlled by mechanism indicated generally at 60, and subsequently to be described.

Latch 58, which is in the nature of a safety device, is V-shaped to provide sloping faces on two sides which are engageable by pin 59 on gear 53, as the latter is rotated in either direction, whereby should some part of the stitcher driving mechanism become jammed or over-loaded the pin 59 will yieldingly urge the latch radially inwardly so as not to affect driving force through stub-shaft 49 and parts driven thereby.

Referring particularly to Figures 7 and 8, the shafts 43 and 49 may have portions 43ª and 49ª which extend toward each other so that the ends are in slightly spaced relation. Fixed in spaced relation to each other on extensions 43ª and 49ª may be collars 61 and 62, respectively, and intermediate these collars, in spaced relation thereto and to each other, may be collars 63 and 64 rotatably mounted on the extensions 43ª and 49ª, respectively. On oppositely disposed faces of these collars may be similar pairs of diametrically spaced pins 65, 65, the pins on a face of one collar being adapted to interengage with those on the opposing face of an adjacent collar when the stub shaft 49 is driven in either direction. When stub shaft 49 is initially driven the pairs of pins, starting with those on collar 62, will engage the corresponding pins on adjacent collars in succession, until driving force is applied through collar 61 to rotate screw shaft 43. In the present case the maximum lost motion in the clutch 51, when shaft 49 is initially driven, would be one and one-half revolutions. Obviously, the amount of lost motion in clutch 51 may be varied by changing the number of pins, or the number of loose collars, or both.

Referring to Figures 3 and 4, pivotally connected to pins 26, on the free end of the lever 25 on each cylinder 22, may be a rod 66, the lower end of which is slidably received in a bore 67 in the top of a piston connector 68 which is pivoted to a suitable piston 69 reciprocably mounted in a bore 70 of the cylinder 22. Pins 71 in rods 66 engage through slots 72 in connector 68 to limit relative movement of rod 66 in bore 67 of the connector, the rod being normally yieldably urged outwardly of the connector by means of a suitable coil spring 73.

Conduits 74, 74 communicating through caps 75, threaded in the bottom of cylinders 22, supply pressure fluid, such as compressed air, to the lower end of chamber 70 to move pistons 69 upwardly thereby simultaneously urging both levers 25, shifting discs 27 upwardly into engagement with work on drum 10, as illustrated in chain-dotted lines in Figure 2. An automatically controlled valve 77, mounted on a bracket 78 carried by base 14, supplies pressure fluid to the cylinders through the conduits 74, from a suitable source of supply (not shown). When pressure is so applied to chamber 70, piston 68 is urged upwardly until shoulder portions 79 thereon engage shoulder portions 80 within the cylinder, so that with proper vertical setting of the cylinders in carriages 19 preferably obtained previously by turning handle 37ª on shaft 37, the discs 27 will be urged into engagement with the tread layer 13 on drum 10 against the yielding action of the springs 73. The mechanism preferably is initially adjusted by setting the discs 27 in the upper positions in which predetermined maximum desired pressure would be applied at the thin edge portions of the tread layer 13, without stretching, distorting or disrupting the same, whereby proportionately increased yielding pressures will be applied where needed at the relatively thicker central tread portions by reason of the inherent action of compression springs 73.

Figure 5:
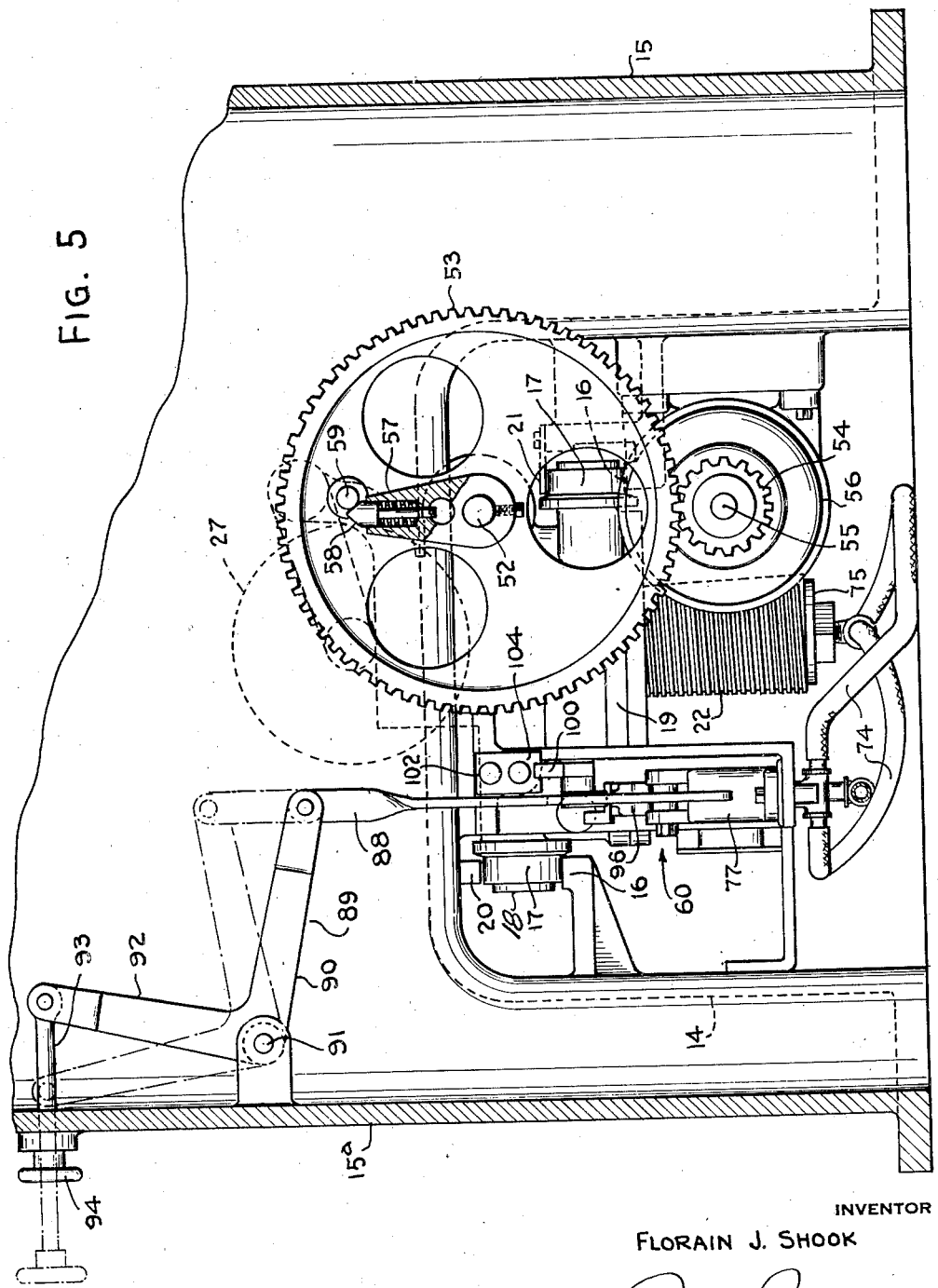
Figure 5 is an enlarged cross-section, partly broken away, taken on line 5—5 of Figure 1.

Referring to the automatic control mechanism 60, best shown in Figures 2, 5 and 6, a lever 81 pivoted on valve 77 at 82 has projecting portions 83, 83 for engaging one or other of a pair of spring-pressed buttons 84, 84 in the valve to control the supply of air to and from the cylinder 22. A spring 85, extending between lever 81 and bracket 78, normally holds the lever 81 in the inoperative position shown in full lines in Figure 2 and in chain-dotted lines in Figure 6, in which valve 77 is set to exhaust air from cylinder 22 to lower the stitcher discs 27. On the free end of lever 81 may be a pin 86 engaging through a slot 87 in one end of a link 88, the other end of the latter being pivoted on an arm 89 of a bell-crank 90 pivoted at 91 to an upwardly extending wall 15a of the base 15. The other arm 92 of the bell-crank has pivoted thereto a rod 93 which slidably extends outwardly through wall 15a. The arrangement is such that an operator, in pulling rod 93 outwardly, by means of a knob 94 thereon, swings bell-crank 90 from the full-line to the chain-dotted positions thereof shown in Figure 5. This lifts the link 88 to engage pin 86 with the bottom of slot 87 and yieldingly swings valve lever 81 on its pivot 82 to the operative position thereof, shown in full lines in Figure 6, thereby supplying air to both cylinders 22 to raise the discs 27 from the inoperative to the operative positions thereof, shown in full and chain-dotted lines respectively, in Figures 2 and 4.

For holding lever 81 in the operative position during a stitching operation a bell-crank 96, pivoted at 96a to bracket 78, may have an arm 95 formed as a latch, this bell-crank being normally yieldably held in inoperative position by a lug 97 on link 88 engaging the other arm 98 thereof (see Figure 2). The weight of the link preferably is sufficient to hold latch 95 in its inoperative position against the yielding action of a spring 99, extending from an upwardly projecting finger 100 on the bell-crank 96 and the bracket 78. When link 88 is initially raised, as described above, spring 99 will swing bell-crank 96 on its pivot, urging latch 95 downwardly as lever 81 swings upwardly, to engage a corner portion of the latch behind a slight projection 101 on the lever substantially above the pivot 82, whereby lever 81 will be held in its operative position, shown in full-lines in Figure 6, until released by means to be described.

Above bell-crank 96 may be a suitable slide member 102 reciprocally mounted in bracket 78, one end of which is engageable by a projection 103 on a stitcher carriage 19, as it moves toward operating mechanism 60, to shift the slide 102 as shown in dotted lines in Figure 6. A plate 104 carried by slide 102 is arranged to be engaged by finger 100 on bell-crank 96, yieldingly to urge the slide toward the stitcher carriages 19 when the bell-crank is released by lug 97 on link 88.

As lever 81 is swung upwardly by the link 88, a lug 105 thereon is arranged to engage the end of a rod 106 slidably mounted in bracket 78, yieldingly to urge the other end of the rod to swing an actuating arm 107 of a double switch 108 of known type. This closes a switch $S_1$ in a pilot circuit $P_1$ (see wiring diagram in Figure 10) energizing a coil $C_1$ to close mechanically interlocked switches F in a motor circuit M, thereby starting the motor 56 for driving screw-shaft 43. Actuation of coil $C_1$ also opens a sticker switch $E_1$ in pilot circuit $P_2$, thereby opening the latter. The delayed action of gear 53 and clutch 51, when switch $S_1$ is initially closed, permits the stitcher discs 27 to move to full engagement with the work at the central portion of the drum 10 before the screw-shaft 43 is actuated to move the discs laterally apart for the stitching operation.

As best shown in Figures 1 and 9, when the right hand stitcher device 11 starts to move toward the automatic control mechanism 60, a cam 19a on carriage 19 disengages an arm 19b of a limit switch 19c to close the same, the switch 19c then remaining closed at all times when motor 56 is running in forward or reverse.

When the stitcher carriages 19 have moved outwardly to the positions thereof shown in chain-dotted lines in Figure 2, projection 103 on the carriage nearest the mechanism 60 engages the end of slide member 102, shifting it to the right as viewed in Figure 6, thereby disengaging latch 95 from projection 101 on lever 81 and allowing spring 85 to swing the lever on its pivot, back to the full line and chain-dotted line positions shown in Figures 2 and 6, respectively. This actuates valve 77 to cut off the air supply and exhausts the air from cylinders 22, allowing the stitcher discs 27 to drop to the full line positions thereof shown in Figures 2 and 4. As lever 81 is thus swung on its pivot the lug 105 thereon disengages the end of rod 106, allowing actuating arm 107 on switch 108 to be urged back to its original starting position (Figure 2), by yieldable means (not shown). The latter movement of arm 107 simultaneously opens switch $S_1$ and closes switch $S_2$ in the pilot circuits $P_1$ and $P_2$, respectively, (see Figure 10). Opening switch $S_1$ opens pilot circuit $P_1$ to deenergize coil $C_1$ thereby opening forward switches F in the motor circuit M and closing sticker switch $E_1$ in pilot circuit $P_2$. Closing switch $S_2$ closes pilot circuit $P_2$ through switch $S_2$, limit switch 19c and sticker switch $E_1$ to energize reversing coil $C_2$, thereby closing mechanically interlocked switches R in the motor circuit M to reverse the motor 56 and at the same time opening the sticker switch $E_2$ in pilot circuit $P_1$. As before, the delayed action of gear 53 and clutch mechanism 51, before screw-shaft 43 starts turning in reverse direction, allows ample time for stitcher discs 27 to drop before they are carried back toward the center of the drum by the reversed rotation of the screw-shaft in carriages 19.

Upon stitcher carriages 19 reaching the central inoperative positions thereof, cam 19a on right hand carriage 19 (see Figures 1, 4 and 9), engages arm 19b of limit switch 19c to open the same, thereby opening pilot circuit $P_2$, deenergizing coil $C_2$ to open switches R in motor circuit M to stop motor 56, and closing sticker switch $E_2$ in pilot circuit $P_1$ (see Figure 10). This sets the wiring circuits and automatic control mechanism in condition for the start of another stitching operation in the manner described.

As best shown in Figure 6, should it be necessary to reverse the forward operation of the discs 27 while the same are in contact with the tire on the drum, as for example, when it is desired to smooth out a wrinkle or remove an obstruction on tread layer 13, the operator need only push rod 93 to urge link 88 slightly downwardly, thereby urging lug 98 against arm 97 and disengaging latch 95 from lever 81. This exhausts the air from cylinders 22 and reverses motor 56 to return the discs to the central inoperative positions thereof in the manner described above.

In the operation of the apparatus to stitch a tread layer 13 on a fabric casing 12, built on drum 10 in a known manner, the stitcher mechanisms 11 are initially in the central inoperative positions thereof, the vertically shiftable cylinders 22 being adjusted in carriages 19 by means of crank handle 37a on shaft 37, to suit the size of the drum 10 and the tire being built thereon. The operator first causes the drum 10 to revolve with the work thereon by operation of mechanism not shown. Next, he pulls out the starting rod 93 of the automatic control mechanism 60 to open valve 77 and actuate arm 107 on the double switch 108, thereby actuating pistons 79 in cylinders 22 to urge the stitcher discs 27 into engagement with the work on the rotating drum 10, and at the same time starting motor 56. When motor 56 is thus initially started, rotation of screw shaft 43 is delayed until pin 59 on driven gear 53 contacts latch 58 to turn stub-shaft 49 and until the delayed action clutch 51 transmits power from the shaft 49 to screw shaft 43, as described above. The mechanism is so designed to allow the stitcher discs 27 to be in full engagement with the work before the shaft 43 is actuated to move the stitcher devices 11 longitudinally apart, thereby insuring that the tread layer will be stitched from the center of the drum to both sides thereof.

When the stitcher devices 11 reach adjacent the edges of the tread stock 13, slide 102 is actuated to trip latch 95 on bell-crank 96, thereby exhausting the air from cylinders 22 to lower the discs 27, and at the same time actuating arm 107 on double switch 108 to reverse the motor 56, and consequently reversing the operation of screw-shaft 43 to return the stitcher devices 11 to the central inoperative positions thereof. Limit switch 19c is then actuated by cam 19a on stitcher carriage 19 to stop motor 56, the wiring circuits (Figure 10) and automatic control mechanism 60 then being set in condition to begin a succeeding stitching cycle upon actuation of operating rod 93 in the manner previously described.

Thus has been provided, simple, efficient, automatically operated apparatus for uniformly stitching the tread layers on pneumatic tire casings, with simple, direct-acting, easily-adjusted means provided to apply pressure to the stitcher discs evenly and proportionately to decrease the stitching pressure of the stitching tools at the relatively thin portions of the tread layer, to prevent buckling, wrinkling or distorting the same.

Modifications of the invention may be resorted to without departing from the spirit thereof or the scope of the appended claims.

What is claimed is:

1. The combination in tire-building apparatus of a rotatable tire-building drum and a stitcher mechanism associated therewith including one or more stitcher tools and a carriage for moving each tool longitudinally of the drum, means for moving said carriage and means for shifting said stitcher tool on the carriage relative to the surfaces of a tire structure which has been applied on the drum, said tool-shifting means including a fluid pressure cylinder mounted on the carriage so as to be adjustable toward and from the drum, means for so adjusting the cylinder on the carriage, a piston in the cylinder adapted to be shifted toward and from the drum by control of supply of fluid pressure to the cylinder, and connector means between the piston and the shiftable stitcher tool including a yielding element between the piston and stitcher tool whereby a direct-line action of the piston through the yielding element to the stitcher tool will press the stitcher tool against the tire on the drum with a pressure determined by the thickness of the tire on the drum at any given point of contact of the stitcher tool with the tire as the carriage is moved longitudinally of the drum.

2. The combination in tire-building apparatus of a rotatable tire-building drum and stitcher mechanism associated therewith including one or more stitcher tools and a carriage for moving each tool longitudinally of the drum, means for moving said carriage longitudinally of the drum and means for shifting said stitcher tool on the carriage relative to the surfaces of a tire structure which has been applied on the drum, said tool-shifting means including a fluid pressure cylinder mounted on the carriage, a piston in the cylinder adapted to be shifted toward and from the drum by control of supply of fluid pressure to the cylinder, means for limiting movement of said piston toward the drum and connector means between the piston and the shiftable stitcher tool including a pair of relatively shiftable members and a yielding element between said members yieldingly urging the same apart whereby a direct-line action of the piston through the yielding element to the stitcher tool will press the stitcher tool against the tire on the drum with a pressure determined by the thickness of the tire on the drum at any given point of contact of the stitcher tool with the tire as the carriage is moved longitudinally of the drum.

FLORAIN J. SHOOK.